April 27, 1965

J. CHUNG 3,180,164

VARIABLE SPEED SHEAVE

Filed May 10, 1963

INVENTOR.
JACKSON CHUNG
BY Hobbs & Easton
ATTORNEYS

INVENTOR.
JACKSON CHUNG

April 27, 1965

J. CHUNG 3,180,164

VARIABLE SPEED SHEAVE

Filed May 10, 1963

INVENTOR.
JACKSON CHUNG
BY Hobbs & Easton
ATTORNEYS

INVENTOR.
JACKSON CHUNG
BY Hobbs & Caston
ATTORNEYS

United States Patent Office 3,180,164
Patented Apr. 27, 1965

3,180,164
VARIABLE SPEED SHEAVE
Jackson Chung, Mishawaka, Ind., assignor to Dodge Manufacturing Corporation, Mishawaka, Ind., a corporation of Indiana
Filed May 10, 1963, Ser. No. 279,567
11 Claims. (Cl. 74—230.17)

The present invention relates to sheaves and more particularly to a variable speed sheave for V-belts and the like.

Variable pitch sheaves for V-belts are extensively used in variable speed drives in which one sheave automatically varies its pitch in accordance with the tension placed on the belt, and the other sheave either is shifted toward or away from the variable pitch sheave or is mechanically controlled to vary its pitch, thereby varying the tension on the belt and thus changing the speed of the variable speed drive. In both the automatically and mechanically variable pitch sheaves, it is normally necessary when varying the pitch and hence the speed of the drive, to maintain the belt on a fixed plane, i.e., avoid shifting the belt laterally in either direction throughout the operating adjustment range of the sheaves. Previously, in a drive having both the mechanically and automatically variable pitch sheaves, the flanges on the sides opposite one another of the two sheaves have been held in fixed axial position and the other flanges of the respective sheaves have been shifted axially in opposite directions as the pitch of one sheave is increased and the pitch of the other decreased. In some installations with mechanically and automatically variable sheaves, both flanges are shifted axially toward and away from one another simultaneously, often using an equalizing means such as a pivoted bar or rack and pinion to maintain the movement of the two flanges equally on both sides of the original belt plane. The automatic variable pitch sheaves of this latter type are particularly adaptable for use in combination with a constant pitch sheave in which one or both of the sheaves are shifted toward or away from one another to vary the tension on the belt, and consequently the pitch on the automatically variable sheave. The prior automatically variable sheaves generally have had inherent disadvantages or difficulties, including binding of the parts while under load, and excessive wearing and fretting of the surfaces between the moving parts, which rendered them unreliable and/or inoperable and resulted in excessive repair and service costs. It is, therefore, one of the principal objects of the present invention to provide a relatively simple and compact variable pitch sheave which can be used satisfactorily either with a constant pitch or mechanically variable pitch sheave, and in which the two flanges thereof are accurately and reliably shifted equally and simultaneously on opposite sides of the original plane of the belt.

Another object of the invention is to provide a variable sheave of rugged and dependable construction in which both flanges are shifted equally and simultaneously in opposite directions to vary the pitch, and in which the mechanism for controlling the movement of both flanges is located on the same side of the sheave structure, thus permitting the belt groove to be constantly positioned adjacent one side of the sheave in substantial alignment with a bearing of the shaft on which the sheave is mounted.

Still another object is to provide a sheave of the aforesaid type which can be easily and readily fabricated, installed and thereafter serviced, and in which the mechanism for adjusting the pitch of the sheave is completely enclosed and protected from dirt, dust, grit and other foreign material.

A further object of the invention is to provide a sheave of the variable pitch type for mounting on the end of a shaft, which is so constructed and designed that the flanges are positioned on a plane adjacent the shaft bearing and in which the means for securing the sheave onto the shaft requires little space between the shaft bearing and the adjacent sheave flange.

Additional objects and advantages of the present invention will become apparent from the following description and accompanying drawings, wherein.

Figure 1:
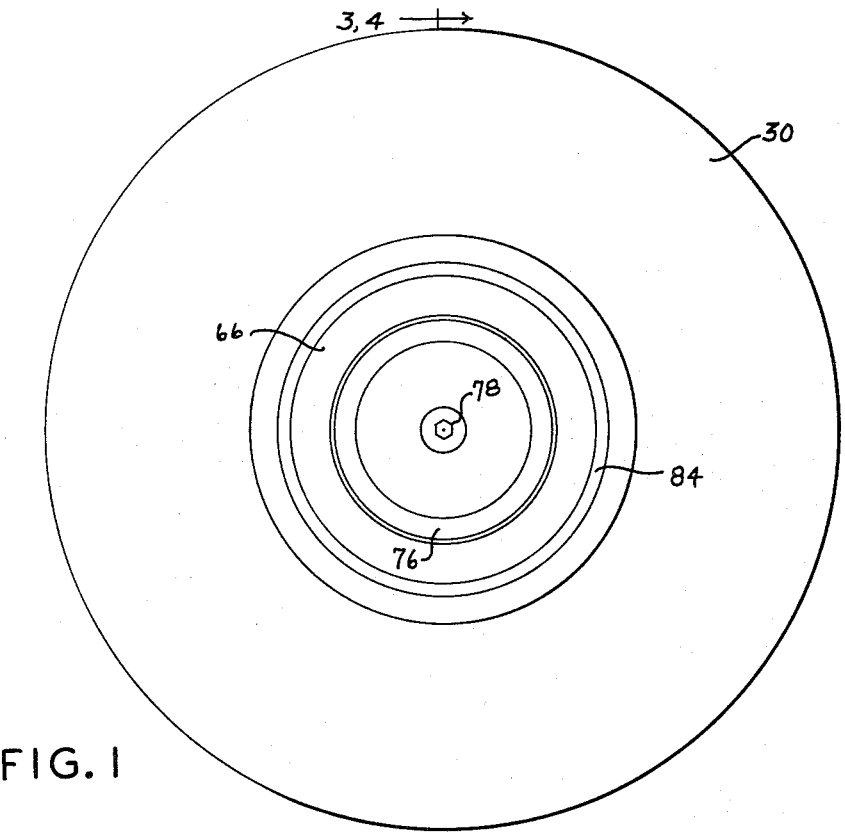
FIGURE 1 is an end elevational view of the present variable pitch sheave.
Figure 2:
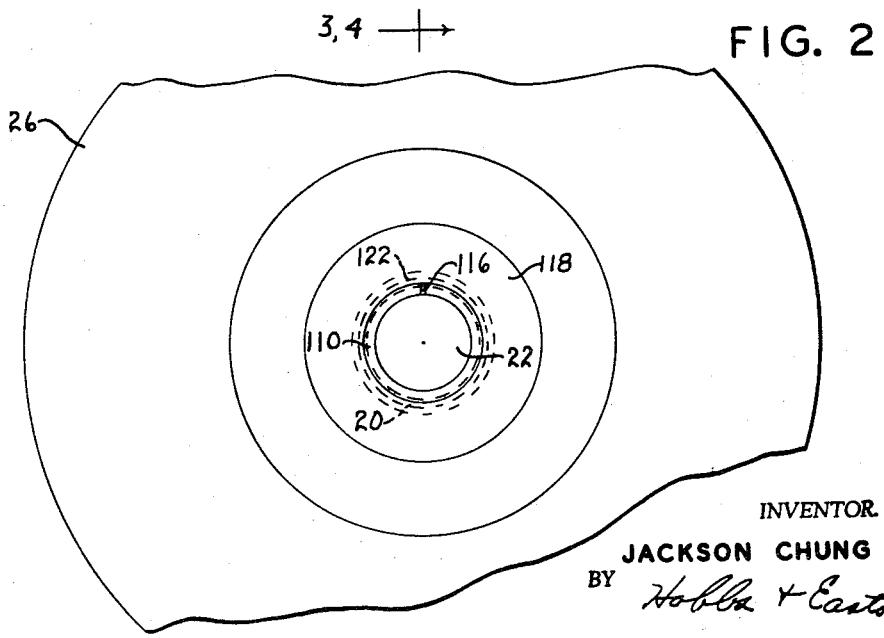
FIGURE 2 is an elevational view of the other end of the present sheave.
Figure 3:
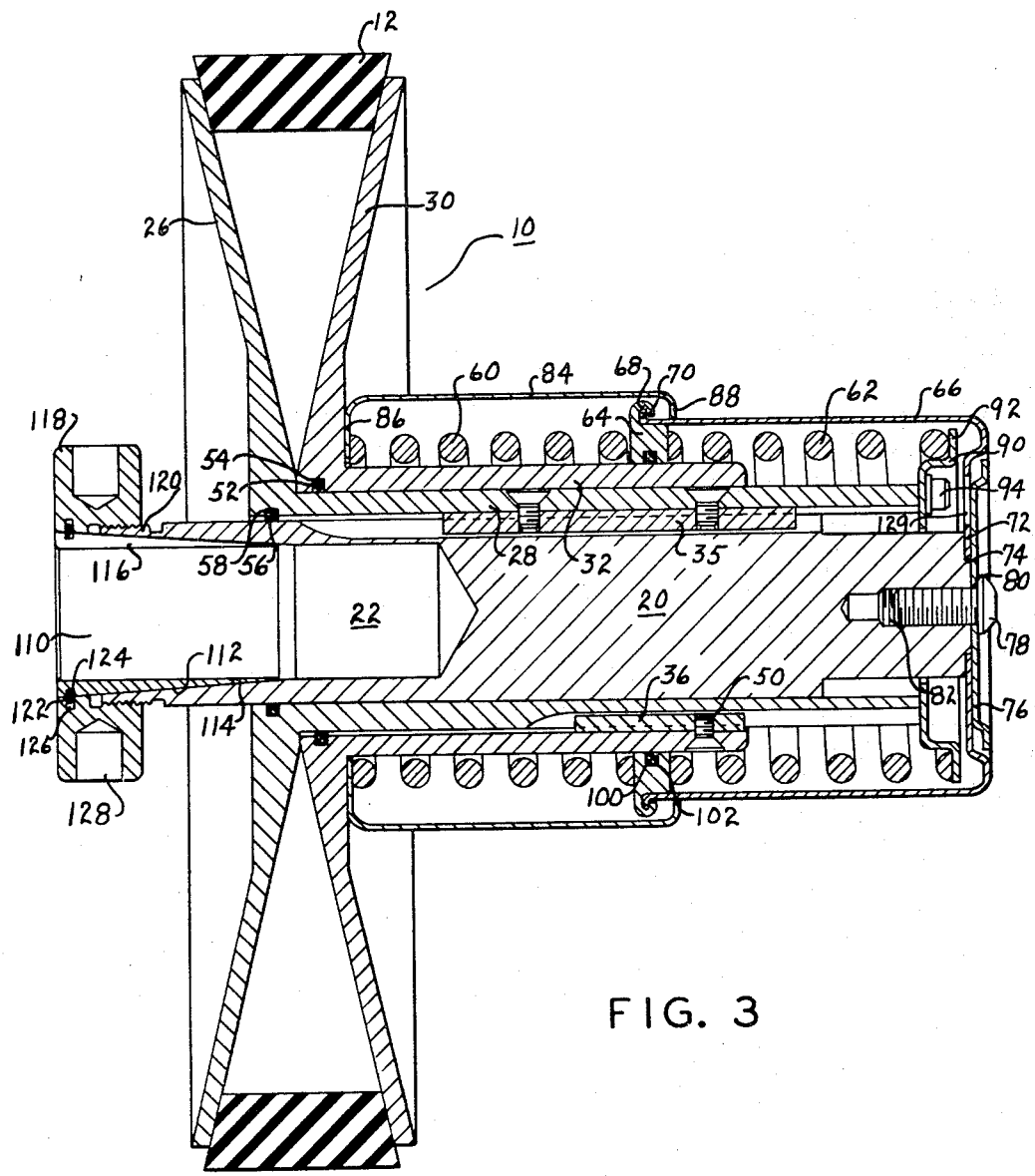
FIGURE 3 is an axial cross sectional view of the present sheave, the section being taken on line 3—3 of FIGURE 1 and showing the sheave in one operating position.
Figure 4:
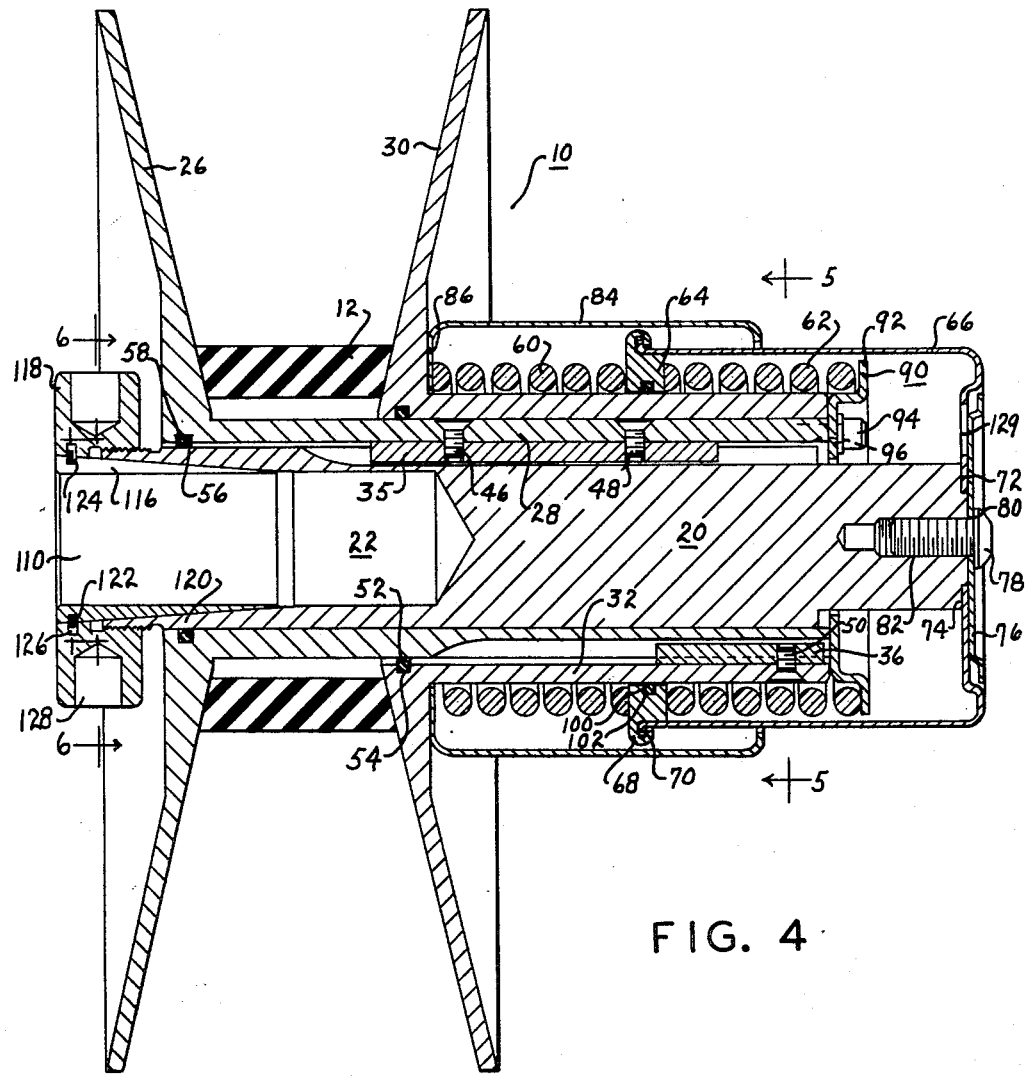
FIGURE 4 is an axial cross sectional view of the present sheave, the section being taken on line 4—4 of FIGURE 1, and showing the sheave in another operating position.
Figure 6:
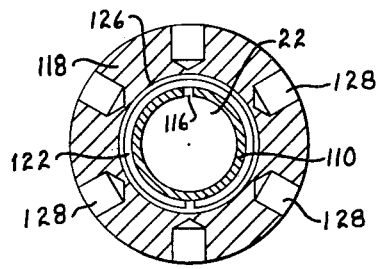
FIGURE 6 is another transverse cross sectional view of the sheave, the section being taken on line 6—6 of FIGURE 4.
Figure 5:
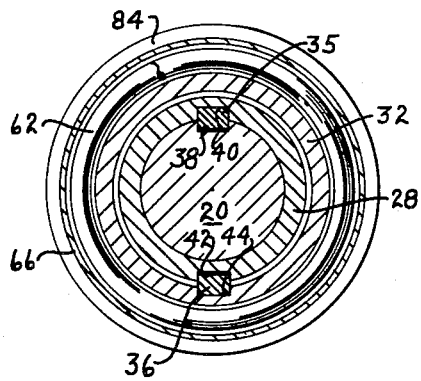
FIGURE 5 is a transverse cross sectional view of the sheave, taken on line 5—5 of FIGURE 4.

Referring more specifically to the drawings, numeral 10 designates the present variable pitch sheave and numeral 12 a V-belt. The construction of the sheave, which is best illustrated in FIGURES 3 and 4, consists of a sleeve hub 20 having a longitudinal bore 22 extending inwardly from the left-hand end, as viewed in the two figures, for receiving the end of a drive or driven shaft (not shown). Mounted on sleeve hub 20 is an inner flange 26 having a sleeve 28 secured rigidly thereto and extending longitudinally and concentric with hub 20 on which it is adapted to slide when adjustments in the pitch of the sheave are being made, and mounted on sleeve 28 and concentric therewith is an outer flange 30 having a sleeve 32 secured rigidly thereto and slidable longitudinally on sleeve 28 when adjustments are being made. The inner and outer flanges consist primarily of frusto-conically shaped discs extending outwardly from the sleeves and forming contact surfaces for V-belt 12.

Hub 20, inner and outer flanges 26 and 30, and sleeves 28 and 32 are driven in unison from a drive shaft, for example, and are locked against relative rotation by two drive keys 35 and 36, key 35 being seated in outwardly facing groove 38 in the external surface of hub 20 and inwardly facing groove 40 in the internal surface of sleeve 28, and key 36 being seated in outwardly facing, longitudinal groove 42 in the external surface of sleeve 28 and longitudinally extending groove 44 in the internal surface of sleeve 32. Key 35 is rigidly secured in groove 40 by two screws 46 and 48 extending inwardly through holes in sleeve 28 into threaded holes in key 35, and key 36 is held rigidly in groove 44 by a screw 50 extending inwardly through a hole in sleeve 32 into a threaded hole in key 36. From the foregoing construction, it is seen that sleeve 28 rotates with hub 20, but is free to shift axially on the hub, and sleeve 32 rotates with sleeve 28 and hub 20, but is free to shift axially with respect to both sleeve 28 and hub 20. In order to seal in the lubricant in the bearing surfaces between sleeves 28 and 32, and O-ring gasket 52 seated in annular groove 54 is placed at the lower edge of flange 30 and, in order to seal in the lubricant on the bearing surfaces between the sleeve 28 and hub 20, an O-ring gasket 56 seated in groove 58 is positioned beneath the flange 26. The hub 20 and the two sleeves and respective flanges are preferably formed of steel, although other suitable materials, such as aluminum, may be used for certain installations.

The adjustment mechanism for controlling the pitch of the sheave in response to the tension on belt 12 consists of a pair of coil springs 60 and 62 which are equally rated for expansion and contraction under load and are the same diameter in length and wire size. The two springs are mounted on sleeve 32 in close proximity to the surface thereof and are separated from one another by an abutment member or ring 64 disposed around sleeve 32 and connected to hub 20 by a cup-shaped retainer 66 which is rigidly attached to the annular abutment ring by inwardly extending U-shaped flange 68 on the abutment ring engaging an annular external flange 70 on the inner edge of retainer 66. The outer end of retainer 66 is connected to the hub by a disc-shaped end member 72 seating in an annular groove 74 on the end of the hub and held in firm engagement with the end of the hub by a disc-shaped plate 76 rigidly secured to the end of the hub by a bolt 78 extending through a hole 80 in the disc-shaped member and extending into a threaded axial hole 82 in hub 20. A cover 84 is disposed over spring 60 and is provided with inwardly extending inner and outer internal flanges 86 and 88 for effectively protecting the spring and other internal control mechanism parts from dirt and other foreign material. The spring 60 reacts in effect between the flange 30 and annular abutment ring 64 with internal flange 86 of cover 84 being disposed between flange 30 and the adjacent end of the spring, and spring 62 reacts between the opposite side of abutment ring 64 and a retainer 90 having an outwardly projecting flange 92 for engaging the adjacent end of spring 62. Retainer 90 is secured to the end of sleeve 28 by a plurality of screws 94 extending through the retainer and threadedly seating in a hole 96 in the end of sleeve 28. An O-ring gasket 100 disposed in annular groove 102 forms a lubricant seal between annular abutment member 64 and the external surface of sleeve 32.

In the present pitch control mechanism, the adjacent ends of springs 60 and 62 are in effect anchored to or supported by hub 20 through retainer 66 and annular abutment ring 64 and the opposite end of spring 60 reacts against flange 30, and the opposite end of spring 62 reacts against flange 26 in the opposite direction by applying force through retainer 90, screws 94 and sleeve 28. As belt 12 applies increased force on the internal sides of flanges 26 and 30, the two flanges move outwardly in response to the increased force, flange 30 compressing spring 60 as it is held firmly against fixed annular abutment ring 64, and flange 26 comprising spring 62 as it is held firmly against the fixed abutment ring. Since the two springs are equally rated for expansion and contraction under load, the two flanges move outwardly and inwardly the same distance from the original center plane of belt 12 as the tension on the belt is increased and decreased.

In order to permit the present variable pitch sheave to be mounted on the end of a shaft with the flanges thereof in close proximity to the shaft bearing, a special sheave securing means is used, consisting of a split bushing 110 having an external tapered surface 112 for engaging a corresponding tapered surface 114 in bore 22 of hub 20, the split in the bushing consisting of a longitudinal slot 116 extending throughout the length of the bushing. A collar 118 threaded onto an extension 120 of hub 20 is connected to bushing 110 by a snap ring 122 seated in external annular groove 124 in the bushing and a matching internal annular groove 126 on the internal surface of collar 118. After the collar and bushing have been assembled and joined together by snap ring 122, the bushing can effectively be urged inwardly against tapered surface 114 of bore 22 to contract the bushing into firm engagement with the shaft. A plurality of holes 128 are provided in the periphery of collar 118 for receiving a shaft or other suitable tool for tightening and loosening collar 118 and bushing 110.

In assembling the present variable pitch sheave, the two flanges and respective sheaves are mounted on hub 20 with springs 60 and 62 mounted around sleeve 32 with retainer 90 disengaged from sleeve 28. Before plate 76 is secured to hub 20, screws 94 are inserted through retainer 90 into the respective holes in sleeve 28 and are tightened to secure the retainer 90 to the end of the sleeve and to hold spring 62 in place between abutment 64 and retainer 90. One or more holes 129 are provided in end member 72 of retainer 66 for inserting a screw driver or wrench through the retainer to tighten screws 94. Thereafter, plate 76 is secured in place by screw 78 and the sheave is mounted on the shaft and secured thereto by tightening collar 118.

In the operation of the present sheave, either with a mechanically variable pitch sheave or a constant pitch sheave, varying the tension on belt 12 applies a lateral force against the internal surface of flanges 26 and 30, thus urging the two flanges outwardly from the center plane of the belt. Since springs 60 and 62 are equally rated for expansion and contraction under load, the two flanges are maintained an equal distance at all times from the original center plane of the belt as the belt moves inwardly and outwardly in response to an increase and decrease in tension thereon. Keys 35 and 36, in their respective grooves, cause the hub 20 and the two sleeves 28 and 32 and the respective flanges to rotate in unison, operating on either the driving or driven shaft.

While only one embodiment of the present variable pitch sheave has been described in detail herein, various changes and modifications may be made without departing from the scope of the present invention.

I claim:

1. A variable pitch sheave for a belt, comprising a hub, an inner flange having a sleeve on said hub, an outer flange having a sleeve on said first mentioned sleeve, opposed spring means around said hub on the same side of said flanges for controlling the movement of said flanges in response to variations in tension on the belt, and an abutment means disposed between and engaged on opposite sides by said springs and connected to the hub.

2. A variable pitch sheave for a belt, comprising a hub, an inner flange having a sleeve on said hub with an outwardly extending flange thereon adjacent the end opposite said flange, an outer flange having a sleeve on said first mentioned sleeve, a ring-shaped abutment member positioned adjacent the external surface of the sleeve of said outer flange and having an abutment surface facing said outwardly extending flange on the side adjacent thereto and a second abutment surface facing away from said flange and being spaced further therefrom than said first abutment surface, a member secured at one end to said abutment member and at the other end to the end of said hub for retaining said abutment member in fixed position relative to said hub, a coil spring around the sleeve of said outer flange reacting between said abutment member and said outer flange, and a second coil spring around the sleeve of said outer flange reacting between said abutment member and said outwardly extending flange.

3. A variable pitch sheave, comprising a hub, an inner flange having a sleeve on said hub with an outwardly extending flange thereon adjacent the end opposite said flange, an outer flange having a sleeve on said first mentioned sleeve, an abutment member positioned adjacent the external surface of the sleeve of said outer flange between the flange and outwardly extending flange and having oppositely facing abutment surfaces disposed between said outer flange and said outwardly extending flange, a member secured at one end to said abutment member and at the other end to the end of said hub for retaining said abutment member in fixed position relative to said hub, a coil spring around the sleeve of said outer flange reacting between said abutment member and said outer flange, and a second coil spring around the sleeve of said outer flange reacting between said abutment member and said outwardly extending flange, said springs being equally rated for expansion and contraction under load.

4. A variable pitch sheave for mounting on the end of a shaft, comprising a hub having an axial bore extending inwardly from one end, an inner flange having a sleeve on said hub with an outwardly exetnding flange thereon adjacent the end opposite said flange, an outer flange having a sleeve on said first mentioned sleeve, an annular abutment member disposed around the sleeve of said outer flange between the flange and outwardly extending flange and having outwardly facing abutment surfaces disposed between said outer flange and said outwardly extending flange, a cup-shaped member secured at its periphery to said abutment member and at the other end to the end of said hub for retaining said abutment member in fixed position relative to said hub, a coil spring around the sleeve of said outer flange reacting between said abutment member and said outer flange, and a second coil spring around the sleeve of said outer flange recting between said abutment member and said outwardly extending flange, said springs being the same size and equally rated for expansion and contraction under load.

5. A variable pitch sheave for mounting on the end of a shaft, comprising a hub having an axial bore extending inwardly from one end and an annular shoulder on the other end and a longitudinal groove in the surface thereof, an inner flange having a sleeve on said hub with a longitudinal groove in the internal surface thereof paralleling the groove in said hub and a longitudinal groove in the external surface thereof, a key in said first two mentioned grooves, a radially extending annular projection on said sleeve, an outer flange having a sleeve on said first mentioned sleeve with a longitudinal groove in the internal surface thereof paralleling the groove in the external surface of said first mentioned sleeve, a key in said last two mentioned grooves, an abutment member positioned adjacent the external surfce of the sleeve of said outer flange and having oppositely facing abutment surfaces disposed between said outer flange and said projection, a member secured at one end to said abutment member and at the other end to the end of said hub for retaining said abutment member in fixed position relative to said hub, a coil spring around the sleeve of said outer flange reacting between said abutment member and said outer flange, and a second coil spring around the sleeve of said outer flange reacting between said abutment member and said projection, said springs being the same size and equally rated for expansion and contraction under load.

6. A variable pitch sheave for mounting on the end of a shaft, comprising a hub having an axial bore extending inwardly from one end and an annular shoulder on the other end and a longitudinal groove in the surface thereof, an inner flange having a sleeve on said hub with a longitudial groove in the internal surface thereof paralleling the groove in said hub and a longitudinal groove in the external surface thereof, a key in said first two mentioned grooves, a radially extending annular projection on said sleeve, an outer flange having a sleeve on said first mentioned sleeve with a longitudinal groove in the internal surface thereof paralleling the groove in the external surface of said first mentioned sleeve, a key in said last two mentioned grooves, an annular abutment member disposed around the sleeve of said outer flange and having oppositely facing abutment surfaces disposed between said outer flange and said projection, a cup-shaped member secured at its periphery to said abutment member and at the other end of the end of said hub around said shoulder for retaining said abutment member in fixed position relative to said hub, a coil spring around the sleeve of said outer flange reacting between said abutment member and said outer flange, and a second coil spring around the sleeve of said outer flange reacting between said abutment member and said projection, said springs being the same size and equally rated for expansion and contraction under load.

7. A variable pitch sheave for mounting on the end of a shaft, comprising a hub having an axial bore extending inwardly from one end and an annular shoulder on the other end and a longitudinal groove in the surface thereof, an inner flange having a sleeve on said hub with a longitudinal groove in the internal surface thereof paralleling the groove in said hub and a longitudinal groove in the external surface thereof, a key in said first two mentioned grooves, a radially extending annular projection on said sleeve, an outer flange having a sleeve on said first mentioned sleeve with a longitudinal groove in the internal surface thereof paralleling the groove in the external surface of said first mentioned sleeve, a key in said last two mentioned grooves, an abutment member positioned adjacent the external surface of the sleeve of said outer flange and having an abutment surface facing said flange on the side adjacent thereto and a second abutment surface facing away from said flange and being spaced further therefrom than said first abutment surface, a member secured at one end to said abutment member and at the other end to the end of said hub for retaining said abutment member in fixed position relative to said hub, a coil spring around the sleeve of said outer flange reacting between said abutment member and said outer flange, a second coil spring around the sleeve of said outer flange reacting between said abutment member and said projection, said springs being the same size and equally rated for expansion and contraction under load, the bore in said hub having an inwardly tapered wall, a split tapered bushing engaging said tapered wall and extending beyond the hub, a collar threadedly received on the end of said hub at said bore, said bushing having an external annular groove therein and said collar having an internal groove therein around the groove in said bushing, and a ring in said annular grooves locking said collar onto said bushing for relative rotation to one another.

8. A variable pitch sheave for mounting on the end of a shaft, comprising a hub having an axial bore extending inwardly from one end and an annular shoulder on the other end and a longitudinal groove in the surface thereof, an inner flange having a sleeve on said hub with a longitudinal groove in the internal surface thereof paralleling the groove in said hub and a longitudinal groove in the external surface thereof, a key in said first two mentioned grooves, a radially extending annular projection on said sleeve, an outer flange having a sleeve on said first mentioned sleeve with a longitudinal groove in the internal surface thereof paralleling the groove in the external surface of said first mentioned sleeve, a key in said last two mentioned grooves, an annular abutment member disposed around the sleeve of said outer flange and having an abutment surface facing said flange on the side adjacent thereto and a second abutment surface facing away from said flange and being spaced further therefrom than said first abutment surface, a cup-shaped member secured at its periphery to said abutment member and at the other end to the end of said hub around said shoulder for retaining said abutment member in fixed position relative to said hub, a coil spring around the sleeve of said outer flange reacting between said abutment member and said outer flange, a second coil spring around the sleeve of said outer finge reacting between said abutment member and said projection, said springs being the same size and equally rated for expansion and contraction under load, the bore in said hub having an inwardly tapered wall, a split tapered bushing engaging said tapered wall and extending beyond the hub, a collar threadedly received on the end of said hub at said bore, said bushing having an external annular groove therein and said collar having an internal groove therein around the groove in said bushing, and a snap ring in said annular groove locking said collar onto said bushing for relative rotation to one another.

9. In a power drive element: a variable pitch sheave for a belt, a hub having an axial bore extending inwardly from one end, an inner flange having a sleeve on said hub, an outer flange having a sleeve on said first mentioned sleeve, an opposed spring means around said hub on the same side of said flanges, the bore in said hub having an inwardly tapered wall, a split tapered bushing engaging said tapered wall and extending beyond the hub, a collar threadedly received on the end of said hub at said bore, said bushing having an external annular groove therein and said collar having an internal groove therein around the groove in said bushing, and a ring in said annular grooves locking said collar onto said bushing for relative rotation to one another.

10. In a power drive element: a hub having an axial bore extending inwardly from one end, the bore in said hub having an inwardly tapered wall, a split tapered bushing engaging said tapered wall and extending beyond the hub, a collar threadedly received on the end of said hub at said bore, said bushing having an external annular groove therein and said collar having an internal groove therein around the groove in said bushing, and a ring in said annular grooves locking said collar onto said bushing for relative rotation to one another.

11. In a power drive element: a hub having an axial bore extending inwardly from one end, the bore in said hub having an inwardly tapered wall, a split tapered bushing engaging said tapered wall and extending beyond the hub, a collar threadedly received on the end of said hub at said bore, said bushing having an external annular groove therein and said collar having an internal groove therein around the groove in said bushing, and a ring in said annular grooves locking said collar onto said bushing for relative rotation to one another.

References Cited in the file of this patent

UNITED STATES PATENTS

| | | | |
|---|---|---|---|
| 2,611,277 | 9/52 | Mitchell | 74—230.17 |
| 2,721,484 | 10/55 | Otto | 74—230.17 |
| 2,952,161 | 9/60 | Williams | 74—230.17 |

DON A. WAITE, *Primary Examiner.*

BROUGHTON G. DURHAM, *Examiner.*